G. B. SHAFFER.
CABINET FOR PHONOGRAPH RECORDS.
APPLICATION FILED OCT. 1, 1908.
1,100,401.
Patented June 16, 1914.
3 SHEETS—SHEET 1.
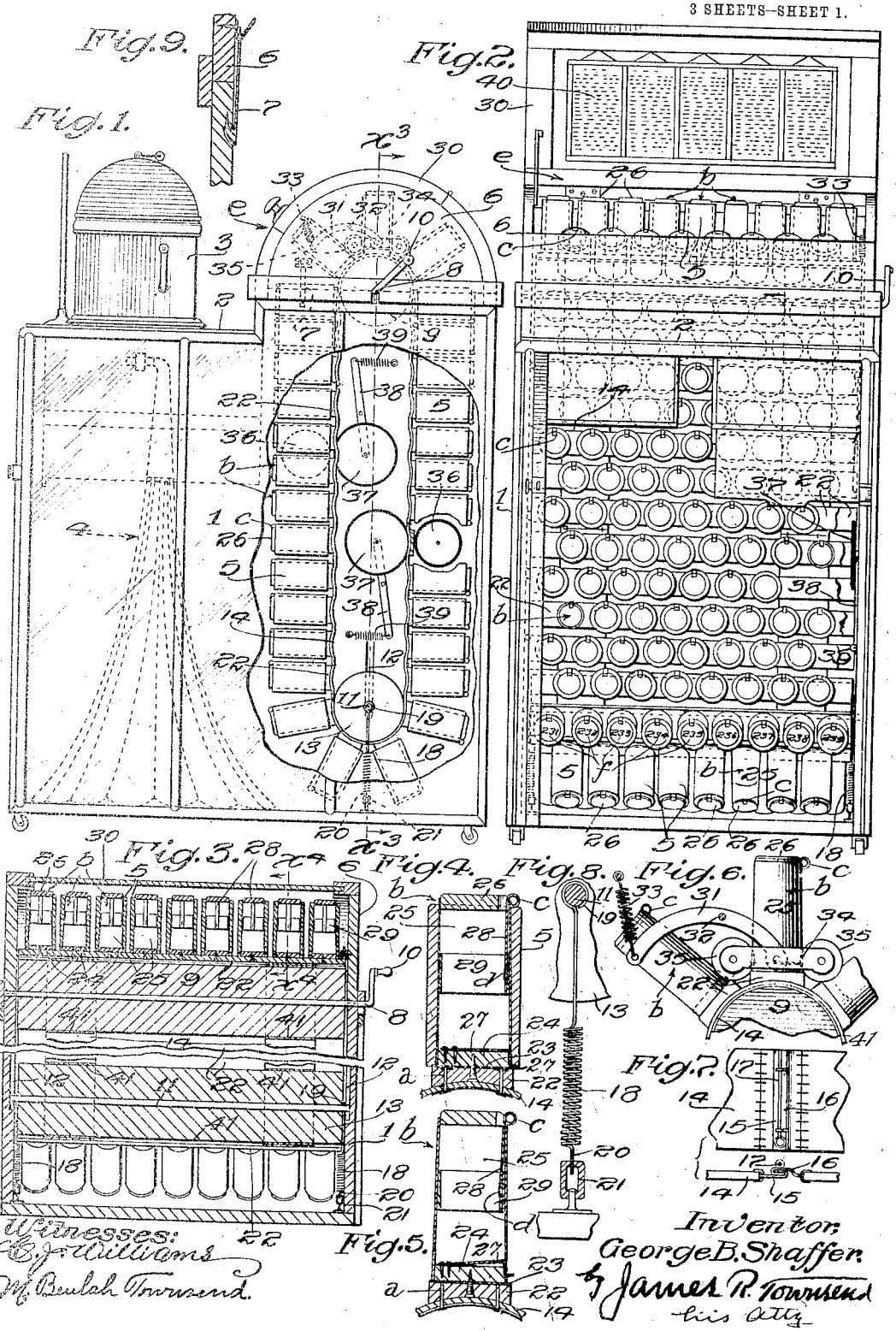

G. B. SHAFFER.
CABINET FOR PHONOGRAPH RECORDS.
APPLICATION FILED OCT. 1, 1908.
1,100,401.
Patented June 16, 1914.
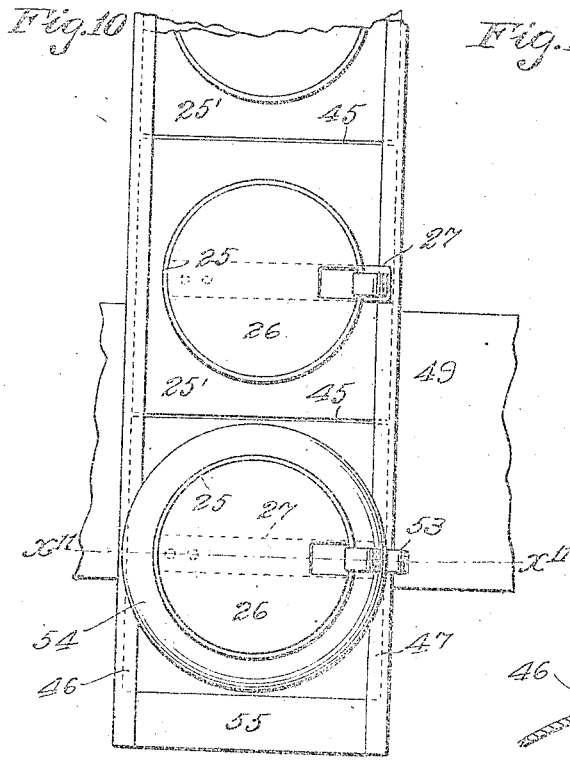
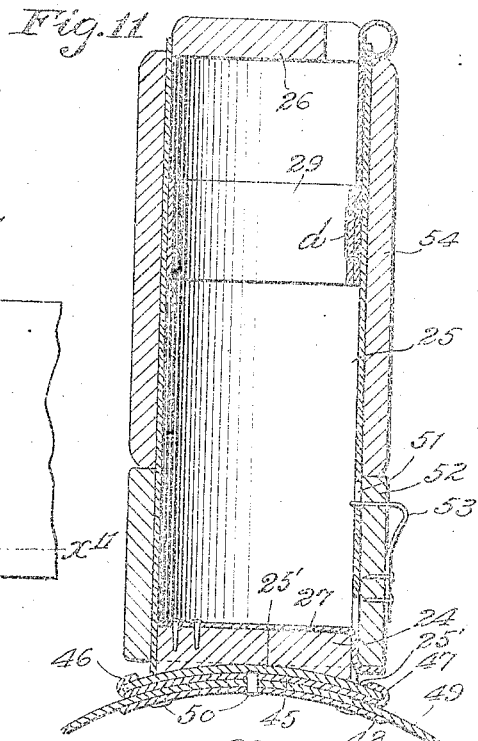
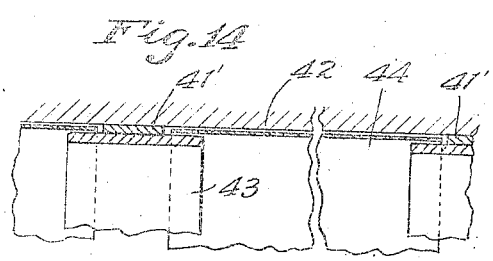
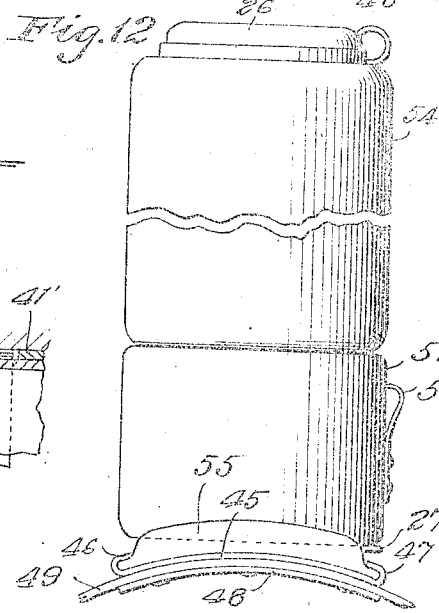
Witnesses
C. C. Holly
S. G. Wells
Inventor
George B. Shaffer
by James R. Townsend
his atty.

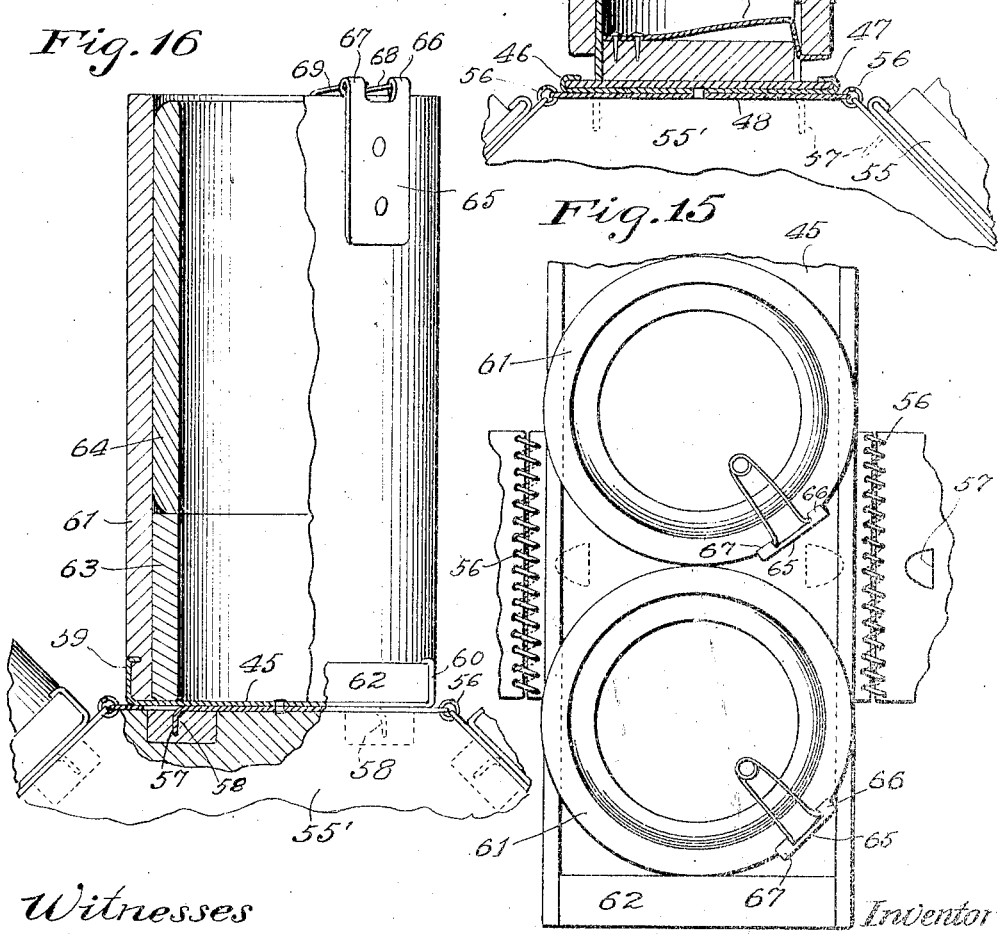

UNITED STATES PATENT OFFICE.

GEORGE B. SHAFFER, OF LOS ANGELES, CALIFORNIA.

CABINET FOR PHONOGRAPH-RECORDS.

1,100,401.  Specification of Letters Patent.  Patented June 16, 1914.

Application filed October 1, 1908. Serial No. 455,782.

*To all whom it may concern:*

Be it known that I, GEORGE B. SHAFFER, a citizen of the United States, residing at Los Angeles, in the county of Los Angeles and State of California, have invented a new and useful Cabinet for Phonograph-Records, of which the following is a specification.

An object of this invention is to provide means for conveniently and compactly storing phonograph-records, and to make said records readily accessible to the attendant.

In carrying out this invention further objects and advantages are attained, among which may be enumerated noiseless means for moving the records inside the cabinet to and from storing position, and to bring the records into position for removal by the attendant; spacing the records apart at the station where they are accessible to the attendant and holding them close together without liability of their being knocked against one another while they are in storing position, thus economizing space where required and giving freedom of movement to the attendant without liability of jamming or striking the records together in the operation of removing and replacing the same; holding the records stationary at all times desired; providing for convenient indexing, and to provide means for holding the index convenient for inspection when the records are accessible; also to make provision for holding the phonograph conveniently near the place where the records are accessible, and to provide for storing horns and other appliances and other attachments for a phonograph.

Further objects and advantages may appear from the subjoined detailed description.

The invention may be variously constructed, and comprises a belt led over a roller and provided with means to hold the records so that the same project from the belt. This arrangement allows the records to stand close together except while above or below the roller, and at these places they will be caused to spread apart to stand radially relative to the roller at which they are. The belt-carrying rollers may be octagonal or otherwise provided with facets, or may be cylindrical. The forms illustrated are cylindrical and octagonal.

The accompanying drawings illustrate the invention in a form at present deemed preferable.

Figure 1 is an elevation of a phonograph-cabinet embodying this invention. The parts are shown in position when the phonograph is not in use, and the records and the horn are stored out of the way of dust and danger of injury. The cabinet is viewed from the side on which the operator or attendant will stand while operating the phonograph. The cabinet-wall is broken to expose interior parts. Fig. 2 is a view from the left of Fig. 1, omitting the phonograph, and showing the record-chamber open to allow access to the records. The door of the cabinet is open, exposing the record-holders and records inside the cabinet. Parts are broken away to expose parts that would otherwise be hidden. Records are shown on all but three of the record-holders. Fig. 3 is a broken section on line $x^3$, Fig. 1. Fig. 4 is a detailed section on line $x^4$, Fig. 3, to show a record-holder and its support, and a record on the holder. Fig. 5 is a sectional detail of the same holder when the record is removed. Fig. 6 is a fragmentary detail of parts shown in dotted lines in the upper portion of Fig. 1, illustrating the brake for holding the record-belt stationary when required and allowing the same to be turned noiselessly and readily. Fig. 7 is a fragmentary detail plan and edge view to show means for connecting the ends of the record-belt. Fig. 8 is a fragmental, sectional detail of the tension device and roller for the record-belt. Fig. 9 is a fragmentary, sectional detail of a catch to hold the top section of the record-chamber in place, and to allow its removal when it is desired to gain access to the inside of the record-chamber. Fig. 10 is a plan illustrating the use of metallic slats. Fig. 11 is a vertical cross-section on line $x^{11}$, Fig. 10, and illustrating the use of short records on long holders. Fig. 12 is an end elevation of the parts shown in Fig. 10. Fig. 13 is a diagrammatic cross-section of the index. Fig. 14 is an enlarged sectional detail of the parts diagrammed in Fig. 13. Fig. 15 is a fragmental plan illustrating the use of metallic slats, metallic belts and internal record-holders. Fig. 16 is a fragmental elevation of the construction shown in Fig. 15, parts being shown in section to illustrate the use of a short record and a filler in a long record-holder. Fig. 17 is an inside elevation of the catch for holding the records in place in the holder, the holder being broken away. Fig. 18 is a vertical sectional elevation analogous to Fig. 11 and showing flat metallic slats and metallic hinges, and operating upon an octagonal roller.

1 designates the main body of the case of the cabinet, square or rectangular in plan, and of any desired height.

2 designates a flat top for a part of the cabinet that forms a stand for the phonograph-case 3, and constituting, underneath said flat top, a receptacle in the form of a cupboard designed to store the phonograph-horn 4 stood on end. The other part of the cabinet is open at the top and is designed to receive and store phonograph-records 5, and is closed by a cap 6 that is preferably semi-cylindrical and is held in place by a snap 7.

8 is a shaft journaled in the ends of the cabinet coaxially with the cap, and carrying a roller 9 mounted in a horizontal position within the cabinet, and provided with a crank 10 to rotate the roller 9.

11 indicates a counter-shaft mounted loosely in slots 12 upon the inner faces of the ends of the cabinet in parallelism with the crank-shaft 8, and carrying a horizontal roller 13.

A belt 14 that may be of canvas or other suitable material, made in one or more, preferably two, bands, is carried by the rollers 9 and 13. The ends of each band of said belt are detachably connected together by hooks 15, 16, and a removable pin 17.

18 indicates retractile coil springs connected by eyes 19 at their upper ends with the ends of the shaft 11, and by turnbuckles 20, 21 at their lower ends with the bottom of the cabinet. The tension of said springs is exerted to stretch the belt and hold it tightly upon the rollers. Slats 22 are secured, as by rivets a, to the belt 14 in parallelism with each other and with the rollers. They may be arranged close together and may be sufficient in number to nearly cover the belt from end to end, leaving slight interspaces between the slats. In the case of cylindrical rollers the inner faces of the slats may be concaved so that the belt will pass smoothly around the rollers, and one or more phonograph record-holders b may be secured to each of the slats. This construction is of great importance for the reason that the belt 14 and consequently the record-holders b will always be automatically maintained in the same vertical alinement from roller 9 to roller 13 and under sufficient tension to keep the peripheries of the phonograph-records 5 in parallelism with one another. Each slat may have a cushion formed of a piece of felt 23 secured to the outer face of its slat and extending from end to end thereof. Each of said holders may comprise a circular head 24 secured to the slat 22 upon, and of less diameter than the width of the felt so that the felt projects beyond the head to form a cushion upon which the record may come to rest; a cylinder 25 of cardboard or other material secured to the head; a second head 26 secured in the outer end of the cylinder; a record supporting and displacing spring 27 secured to the upper face of the inner head 24 and extending outwardly away from the belt to be pressed in toward the belt by the record and to return the record outward; and a spring-snap 28 secured to the inner face of the cylinder and extending upwardly and outwardly and provided at the outer end with a knob or roll c to hold the record in place; the free end of said spring 28 operating through a slot in the cylinder 25 and an opening in the head 26, and the free end of the spring 27 operating through a slot in the cylinder 25, and the outer end of the spring 28 being in the form of a knob, roll or hook c to hold the record in place while the tension of the spring 27 serves to press the record tightly against the knob c to prevent rattling. The spring 28 may be secured to the inner face of the cylinder by any suitable means as a staple d and a reinforcement 29, the latter being glued to the cylinder.

An opening e and a hinged lid 30 therefore provide access to the records through the cap 6. By turning the crank 10, any desired record may be brought into position to be removed through the opening. The outer faces of the slats between the rollers are parallel with the plane of the axes of the rollers, thus holding the holders and their records axially horizontal. As the belt revolves the slat-faces assume variant angles and thereby carry the record-holders and their records axially radial relative to the adjacent roller, so that the outer ends of the records are separated as shown in dotted lines in Fig. 1 and in solid lines in Fig. 6. The records may be marked for identification upon the heads 26 of the record-holders.

A lever 31 is secured to the inner face of the end of the cap 6 by a pivot 32, and is operated by a spring 33 to force toward the belt a bar 34 pivoted to the lever and provided at the ends with rollers 35 that engage opposed slat edges to yieldingly hold the slats at determined positions. Preferably the bar spans one slat and the rollers 35 are positioned such a distance apart that they will fit in spaces between the ends of the slats, as shown in Fig. 6, and to serve as brakes to hold the belt still and the holders steady when it is desired to remove or replace a record.

Disk-rollers 36 are mounted upon the inner faces of the ends of the cabinet in position to engage the outer faces of the ends of the slats, and cushioned rollers 37 are mounted upon levers 38 in opposition to rollers 36, there being retractile coil springs 39 to press the rollers 37 yieldingly against the slats opposite the rollers 36; thus constituting resilient automatic means to steady the load of records and prevent swaying or rattling.

From the foregoing it is now clear that the springs 18, rollers 37, levers 38 and springs 39 coöperate and constitute means acting to prevent lateral vibration of the belt 14 so as to hold the record-holders $b$ substantially in true parallelism to one another so that said record-holders may be arranged very close together to economize space and so that there will be no danger of the records knocking against one another and thereby cracking and breaking them.

I wish to call special attention to the belt or belts, preferably two, mounted upon rollers and the record-holders carried by the belts, said holders being adapted to receive, hold and carry the records without injury, and also to the means of identifying the records.

Numbered indexes 40 are placed upon the inside of the lid in convenient position, and corresponding numbers, as $f$, are placed upon the record-holders.

When it is desired to remove a record, the lid 30 is opened, the handle 10 operated to bring the desired record into vertical position above the roller 9, the rows of records on each side of this row standing at tangents so as to allow easy access to the desired record. Then the handle $c$ is pressed to retract the spring 28, the spring 27 presses the record outwardly, and the record is manually removed. As the roller 10 is operated, the tension of the springs 18 holds the belts straight and tight so that the records intermediate the rollers stand at substantially right angles to the belts.

For cheapness and convenience of manufacture the rollers may be made of wooden bodies with friction faces 41 formed of strips of canvas fastened around the rollers to prevent the belts from slipping.

The details of the index are shown in Figs. 13 and 14. Strips 41' are pasted to the backboard 42 suitable distances apart to form spacing-blocks, and the clamping-strips 43 are pasted to the strips 41' so as to form guides to receive the index-sheets 44 so that the sheets 44 may be removed, placed in a typewriter and have the desired names or numbers printed or written for identifying records; and when the records are changed these sheets may be removed and new sheets inserted or new names and numbers added In the construction shown in Figs. 10, 11 and 12, the metallic slats comprise the body portions 45 and the ways 46 and 47; said ways being formed by folding the edges of the slats upwardly and inwardly, and the body-portion being concavo-convex in cross-section to fit the curvature of the rollers. The holders are adapted for this form of metallic slat by attaching the blocks 24 to square projecting bases 25' so that the bases will slide into the ways 46 and 47. A clamping-plate 48 is placed against the lower face of the belt 49 and secured to the slat-body 45 by rivets 50. The cylinders 25 are secured to the blocks 24 as already described. A latch-opening 51 may be formed in each long cylinder 25, and a filler-cylinder 52 is provided with a catch 53, and said filler may be placed upon the cylinder 25 with the catch 53 engaging in the latch-opening 51 and then a short record 54 may be placed upon the holder. When a long record is to be placed upon the holder the filler 52 is removed. Blocks 55 are placed in the ends of the ways 46 and 47 at one end of each slat to close the ways and form a stop against which the bases 24 are pressed, and these blocks serve as a steadying means to receive the rollers 35 and hold the records steady.

In the construction shown in Fig. 18 the slats are flat to fit the faces of the octagonal roller 55', and the clamping-plates 48 are extended beyond the ways 46 and 47, and said clamping-plates are secured together by wire-lacing 56 to form a belt to fit the roller 55'. Teeth 57 are pressed downwardly from the plates 48 to engage in openings 58 in the roller 55' so as to avoid any tendency of the metallic belt to slip.

In the construction shown in Figs. 15, 16 and 17 the edges of the metallic slat 45 are turned upwardly a considerable distance and then over toward each other to produce enlarged ways 59 and 60, and the holders 61 are made to receive the records inside of the holders instead of outside; and the holders are notched on opposite sides to receive the inwardly-turned flanges of ways 59 and 60, there being blocks 62 at the ends of the ways. A filler 63 may be placed in the holder 61 and then a short record 64 may be placed in the holder. When long records are to be stored the filler 63 is removed or omitted. An attaching-plate 65 is secured to the outer face of the holder 61 at its upper end, and bearings 66 and 67 extend upwardly from the attaching-plate above the upper edge of the holder 61. A latch for holding the records in the holder is formed of spring-wire, and comprises the parallel arms 68 and 69, the coil 70 and the pintles 71 and 72. The latch is mounted with the pintles 71 and 72 in the bearings 66 and 67. Notches 73 and 74 are formed laterally at the inner sides of the bearings 66 and 67 so that when the latch is swung inwardly and down to a horizontal position the tension of the coil 70 will force the arms 68 and 69 into the notches 73 and 74 and hold the record 64 in the holder 61.

A large number of records may be carried in a comparatively small space, thoroughly indexed for immediate identification, and the device easily operated.

While I have shown some of the variations which may be made in the details of construction without departing from the spirit of my invention, it is obvious that numerous other changes might be made, and I do not wish to limit myself to any of the exact details shown and described.

I claim:

1. A cabinet for phonograph records comprising record-holders movably mounted, each record-holder consisting of a support to receive the record, a spring upon the outer end to hold the record, and a spring upon the inner end to press the record against the first spring.

2. In a cabinet for phonograph records, a belt mounted upon rollers, slats attached to the belt, phonograph record-holders secured to the slats, a bar yieldingly mounted upon the inner face of the ends of the cabinet, and rollers upon the bar to engage in the notches between the slats and yieldingly hold the slats in different positions.

3. In a cabinet for phonograph records, a belt mounted upon rollers, slats carried by the belt, phonograph record-holders carried by the slats, and rollers yieldingly mounted to engage the ends of the slats and steady the belt.

4. In a cabinet for phonograph records, a case, rollers mounted in the case, a belt upon the rollers, slats carried by the belt, phonograph record-holders carried by the slats, steadying-rollers mounted upon the frame to engage the ends of the slats between the main rollers, levers pivotally mounted, springs for operating the levers, and steadying-rollers carried by the levers to yieldingly engage the slats in opposition to the first steadying-rollers.

5. In a cabinet for phonograph records, a phonograph record-holder comprising a support attached to a base, means for holding the record upon the support, ways for holding the base, and a belt for carrying the ways.

6. In a cabinet for phonograph records, a belt mounted upon rollers, metallic slats carried by the belt, ways carried by the slats, and phonograph record-holders mounted in the ways.

7. A cabinet for phonograph records, said cabinet comprising a case, rollers at the top and bottom of the case, an endless flexible belt extending from roller to roller, slats mounted on the belt in parallelism to and slightly spaced apart from one another along the belt, record-holders secured to the slats, and means acting to prevent lateral vibration of the belt so as to hold the record-holders substantially in true parallelism to one another.

In testimony whereof, I have hereunto set my hand at Los Angeles, California, this 24th day of September, 1908.

GEO. B. SHAFFER.

In presence of—
JAMES R. TOWNSEND,
M. BEULAH TOWNSEND.